(12) United States Patent
Karino

(10) Patent No.: US 10,804,697 B2
(45) Date of Patent: Oct. 13, 2020

(54) POWER CONVERTER

(71) Applicant: Panasonic Intellectual Property Management Co., Ltd., Osaka (JP)

(72) Inventor: Hideyuki Karino, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 84 days.

(21) Appl. No.: 16/254,915

(22) Filed: Jan. 23, 2019

(65) Prior Publication Data

US 2019/0157864 A1 May 23, 2019

Related U.S. Application Data

(63) Continuation of application No. PCT/JP2017/027453, filed on Jul. 28, 2017.

(30) Foreign Application Priority Data

Jul. 29, 2016 (JP) ................... 2016-150641

(51) Int. Cl.

| | | |
|---|---|---|
| *H02J 1/10* | (2006.01) | |
| *H02J 3/38* | (2006.01) | |
| *H02M 3/155* | (2006.01) | |
| *H02M 7/48* | (2007.01) | |
| *H02M 3/00* | (2006.01) | |
| *H02M 1/14* | (2006.01) | |

(Continued)

(52) U.S. Cl.
CPC .............. *H02J 1/102* (2013.01); *H02J 3/383* (2013.01); *H02M 1/14* (2013.01); *H02M 1/143* (2013.01); *H02M 3/00* (2013.01); *H02M 3/04* (2013.01); *H02M 3/155* (2013.01); *H02M 7/48* (2013.01); *H02J 2001/104* (2013.01); *H02M 2003/1586* (2013.01)

(58) Field of Classification Search
CPC ...... H02J 1/10; H02J 3/38; H02J 1/102; H02J 3/383; H02J 2001/104; H02M 3/158; H02M 1/14; H02M 1/143; H02M 3/00; H02M 3/04; H02M 3/155; H02M 7/48; H02M 2003/1586

See application file for complete search history.

(56) References Cited

U.S. PATENT DOCUMENTS

2005/0105224 A1    5/2005   Nishi

FOREIGN PATENT DOCUMENTS

| JP | 2012-050207 A | 3/2012 |
|---|---|---|
| JP | 2015-171178 A | 9/2015 |
| WO | 2016/081473 A1 | 5/2016 |

OTHER PUBLICATIONS

International Search Report issued in corresponding PCT/JP2017/027453, dated Aug. 29, 2017.

(Continued)

*Primary Examiner* — Robert L Deberadinis

(74) *Attorney, Agent, or Firm* — Renner, Otto, Boisselle & Sklar, LLP

(57) ABSTRACT

A plurality of DC/DC converters in a power converter each converts an output voltage of a corresponding one of DC power sources into a voltage of a different value according to a switching operation and outputs the voltage as converted to a common DC bus. A controller controls the plurality of DC/DC converters to perform the switching operation in different phases. The controller resets the phases in accordance with an operating state of the plurality of DC power sources and the plurality of DC/DC converters.

6 Claims, 6 Drawing Sheets

(51) Int. Cl.
*H02M 3/04* (2006.01)
*H02M 3/158* (2006.01)

(56) References Cited

OTHER PUBLICATIONS

Extended European Search Report for corresponding App. No. 17834536.9, dated Jun. 21, 2019.
Liccardo Fetal: 11 Interleaved de-de Converters for Photovoltaic Modules 11, Clean Electrical Power, 2007. ICCEP '07. International Conference on, IEEE, PI, May 1, 2007 (May 1, 2007), pp. 201-207.
Schuck Marcel et al: 11 Ripple minimization 1,2 in asymmetric multiphase interleaved DC-DC switching converters 11, 2013 IEEE Energy Conversion Congress and Exposition, IEEE, Sep. 15, 2013 (Sep. 15, 2013), pp. 133-139.
Schuck Marcel et al: "Ripple Minimization 1,2 Through Harmonic Elimination in Asymmetric Interleaved Multiphase DC-DC Converters", IEEE Transactions on Power Electronics, Institute of Electrical and Electronics Engineers, USA, vol. 30, No. 12, Dec. 1, 2015 (Dec. 1, 2015), pp. 7202-7214.
Kashani Mahsa Ghapandar et al: "Variable 1,2 interleaving technique for photovoltaic cascaded DC-DC converters", !ECON 2014—40th Annual Conference of the IEEE Industrial Electronics Society, IEEE, Oct. 29, 2014 (Oct. 29, 2014), pp. 5612-5617.

POWER CONVERTER

CROSS-REFERENCE TO RELATED APPLICATIONS

This application is a Continuation of International Application No. PCT/JP2017/027453, filed on Jul. 28, 2017, which in turn claims the benefit of Japanese Application No. 2016-150641, filed on Jul. 29, 2016, the disclosures of which Application are incorporated by reference herein.

BACKGROUND

1. Field of the Disclosure

The present disclosure relates to a power converter including a plurality of DC/DC converters that supply power to a common DC bus.

2. Description of the Related Art

Power converters including a plurality of DC/DC converters that supply power to a common DC bus are known (see, for example, Japanese Unexamined Patent Application Publication No. 2015-171178). In these power converters, the DC/DC converters perform a switching operation at different points of time. Therefore, as compared with the case of controlling a plurality of DC/DC converters to perform a switching operation at the same time, the amount of variation in the output current in the DC bus is reduced so that the size of the smoothing capacitor provided in the DC bus is reduced.

There is room for improvement in the smoothing of the output current in these power converters.

SUMMARY

The embodiments address the above-described issue, and a general purpose thereof is to provide a power converter capable of smoothing an output current more properly.

A power converter according to one aspect of the present invention includes: a plurality of DC/DC converters that each converts an output voltage of a corresponding one of DC power sources into a voltage of a different value according to a switching operation and outputs the voltage as converted to a common DC bus; and a controller that controls the plurality of DC/DC converters to perform the switching operation in different phases. The controller resets the phases in accordance with an operating state of the plurality of DC power sources and the plurality of DC/DC converters.

BRIEF DESCRIPTION OF THE DRAWINGS

The figures depict one or more implementations in accordance with the present teaching, by way of example only, not by way of limitations. In the figures, like reference numerals refer to the same or similar elements.

DETAILED DESCRIPTION

First Embodiment

Figure 1:
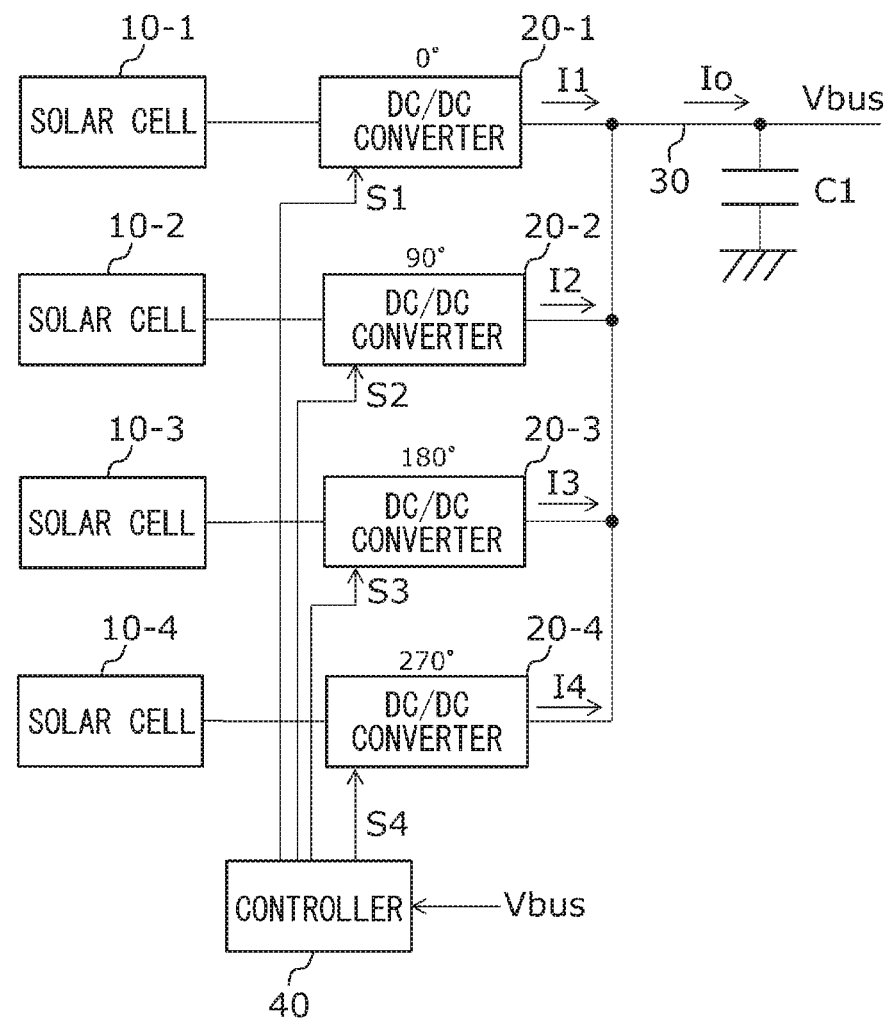
FIG. 1 shows a configuration of a power converter according to a first embodiment.

FIG. 1 shows a configuration of a power converter 1 according to a first embodiment. The power converter 1 includes a plurality of solar cells (DC power source) 10-1~10-4, a plurality of DC/DC converters 20-1~20-4 connected in parallel, a DC bus 30, a capacitor C1, and a controller 40.

The power converter 1 is of multi-string type includes solar cells 10-1~10-4 of a plurality of systems. Each of the solar cells 10-1~10-4 includes a group of a plurality of solar cell panels connected in series. The numbers of solar cell panels connected in series in the solar cells 10-1~10-4 are assumed to be identical. The description here relates to an example where four solar cells 10-1~10-4 and four DC/DC converters 20-1~20-4 are provided, but the number of solar cells or the number of DC/DC converters is not limited.

The input terminal of each of the DC/DC converters 20-1~20-4 is connected to the corresponding one of the solar cells 10-1~10-4. The output terminals of the DC/DC converters 20-1~20-4 are connected commonly to the DC bus 30. Each of the DC/DC converters 20-1~20-4 is, for example, a chopper circuit and converts the output voltage of the corresponding one of the solar cells 10-1~10-4 into a DC voltage of a different value according to a switching operation and outputs the DC voltage as converted to the common DC bus 30. The voltage of the DC bus 30 is a bus voltage Vbus. An output current Io, which is a sum of output currents I1~I4 of the DC/DC converters 20-1~20-4, flows in the DC bus 30.

The capacitor C1 has one end connected to the DC bus 30 and the other end grounded. The capacitor C1 smoothes the output current Io and the bus voltage Vbus. A load such as an inverter (not shown) is further connected to the DC bus 30.

The controller 40 supplies pulse width modulated (PWM) drive signals S1~S4 to the DC/DC converters 20-1~20-4 based on the bus voltage Vbus to control the DC/DC converters 20-1~20-4. More specifically, the controller 40 uses the drive signal S1 to subject the DC/DC converter 20-1 to PWM control so that the bus voltage Vbus approaches a target voltage. The controller 40 similarly subjects the DC/DC converters 20-2~20-4 to PWM control individually.

The controller 40 controls the DC/DC converters 20-1~20-4 to perform the switching operation in different phases, by using the drive signals S1~S4 having different phases. The controller 40 sets initial values of the phases in accordance with the total number (n: n is an integer equal to or greater than 2) of the DC/DC converters 20-1~20-4 so that a phase difference 360°/n is provided. Since n=4 here, the phase difference is 360°/4=90°. Therefore, the initial values of the phases of the drive signals S1~S4 are set to 0°, 90°, 180°, and 270°, respectively, and the DC/DC converters 20-1~20-4 perform the switching operation in the phases 0°, 90°, 180°, and 270°, respectively. In other words, the DC/DC converter 20-1, the DC/DC converter 20-2, the DC/DC converter 20-3, and the DC/DC converter 20-4 perform the switching operation in the stated order and repeatedly.

The total number (n) of the DC/DC converters 20-1~20-4 may be preset in the controller 40 when the power converter is shipped. Alternatively, the total number may be set in the controller 40 by a worker when the power converter 1 is installed.

The controller 40 resets the phases in accordance with the operating state of the solar cells 10-1~10-4 and the DC/DC converters 20-1~20-4. The operation of resetting will be described later.

The configuration of the controller 40 can be implemented by the coordination of hardware resources and software resources or only by hardware resources. An analog device, microcomputer, DSP, ROM, RAM, FPGA, and other LSIs can be used as hardware resources. Programs such as firmware can be used as software resources.

Figure 2:
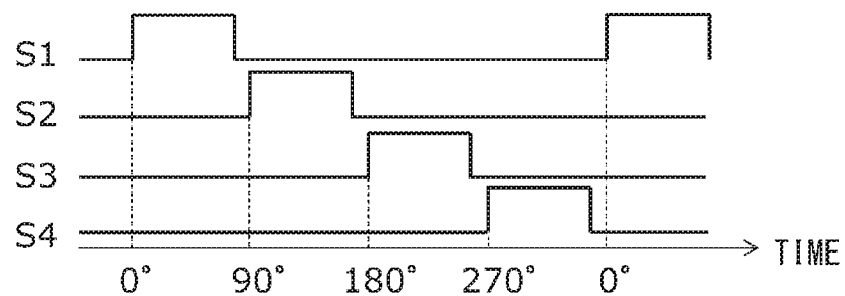
FIG. 2 is a waveform chart showing the drive signals of FIG. 1.

FIG. 2 is a waveform chart showing the drive signals S1~S4 of FIG. 1. As described above, the phases of the drive signals S1~S4 are 0°, 90°, 180°, and 270°, respectively. In other words, the phase difference between the drive signal S1 and the drive signal S2, the phase difference between the drive signal S2 and the drive signal S3, the phase difference between the drive signal S3 and the drive signal S4, and the phase difference between the drive signal S4 and the drive signal S1 are 90°.

Figure 3A:
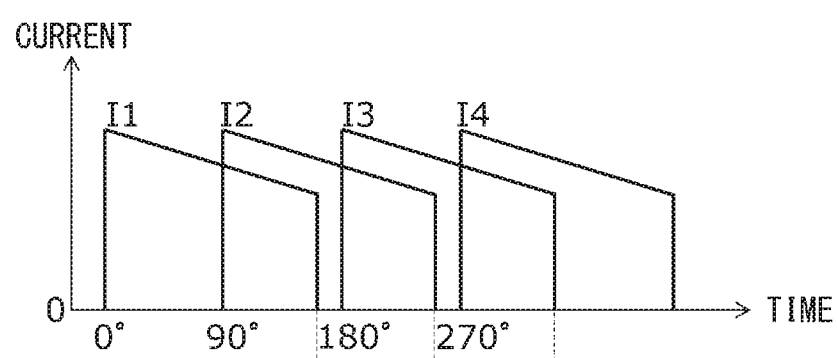
FIG. 3A is a waveform chart showing the output currents of the power converter of FIG. 1.
Figure 3B:
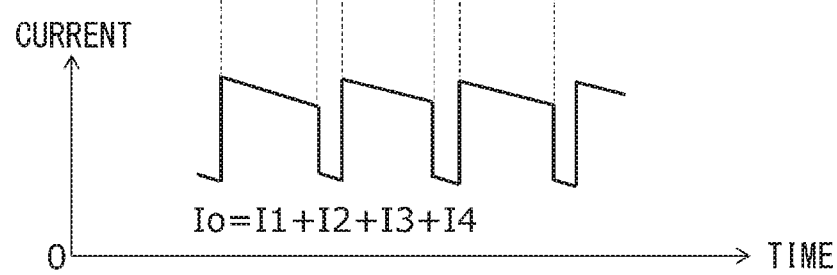
FIG. 3B is a waveform chart showing the output current corresponding to FIG. 3A.

FIG. 3A is a waveform chart showing the output currents I1~I4 of the power converter 1 of FIG. 1, and FIG. 3B is a waveform chart showing the output current Io corresponding to FIG. 3A. As shown in FIG. 3A, each of the output currents I1~I4 flows according to the switching operation of the DC/DC converters 20-1~20-4 and has a ripple. The phase of the output current I1 is equal to the phase of the drive signal S1 and is 0°. The phase of the output current I2 is equal to the phase of the drive signal S2 and is 90°. The phase of the output current I3 is equal to the phase of the drive signal S3 and is 180°. The phase of the output current I4 is equal to the phase of the drive signal S4 and is 270°. By setting the phases in this way, it is ensured that not all output currents I1~I4 flow at the same time.

As shown in FIG. 3B, the ripple is averaged in the output current Io, which is a sum of the output currents I1~I4. If it is assumed that the DC/DC converters 20-1~20-4 perform the switching operation at the same time, all of the output currents I1~I4 flow at the same time so that the amount of variation in the output current Io will be larger than the amount of variation of FIG. 3B. Thus, according to this embodiment shown in FIG. 3B, the amount of variation in the output current Io is reduced as compared with the case of controlling the DC/DC converters 20-1~20-4 to perform the switching operation at the same time. Consequently, the size and capacitance of the capacitor C1 can be made smaller.

If the operating state of the solar cells 10-1~10-4 and the DC/DC converters 20-1~20-4 remains unchanged, the power converter 1 maintains the phases of the initial values and continue the operation shown in FIG. 3A and 3B. Meanwhile, when the operating state of the solar cells 10-1~10-4 and the DC/DC converters 20-1~20-4 changes from the initial state, the controller 40 resets the phases. Several exemplary cases where the operating condition of the solar cells 10-1~10-4 and the DC/DC converters 20-1~20-4 changes will be described below.

EXAMPLE 1

Figure 4:
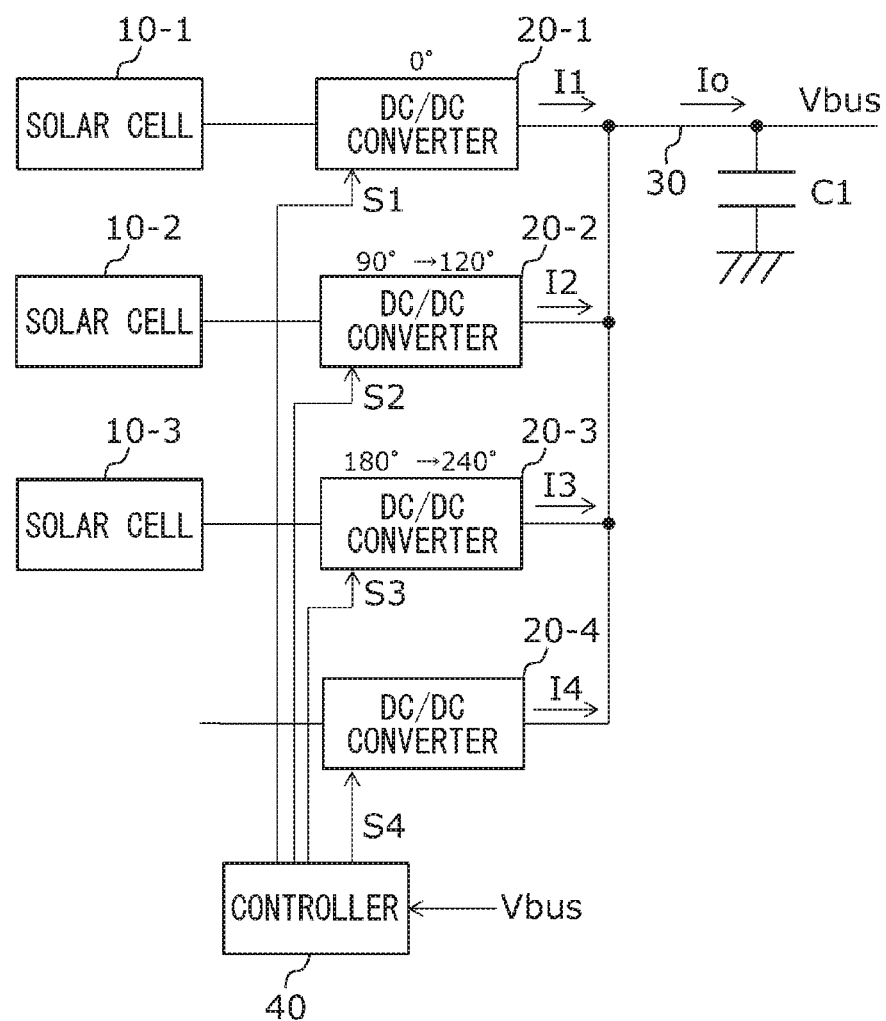
FIG. 4 shows an operation of the power converter performed when a solar cell is not connected.

Case where a solar cell is not connected. FIG. 4 shows an operation of the power converter 1 performed when a solar cell is not connected. Referring to FIG. 4, the solar cell 10-4 of FIG. 1 is removed. The output current I4 of the DC/DC converter 20-4 not connected to the solar cell will be zero. In other words, the output current I4 will be abnormal. Therefore, absence of a ripple in the output current Io occurs periodically if the initially set phases are maintained, resulting in unevenness in the ripple over time. Accordingly, the output current Io will be insufficiently smoothed absent any measures.

To address this, the controller 40 resets the phases, excluding the DC/DC converter 20-4 not connected to the solar cell, i.e., the DC/DC converter 20-4 for which the output current I4 is abnormal. When the solar cell is not connected, the switch (not shown) in the junction box between the solar cell and the DC/DC converter 20-4 is open. The controller 40 monitors the state of the switch and determines the DC/DC converter 20-4 connected to the open switch as the DC/DC converter 20-4 not connected to the solar cell. Alternatively, the controller 40 may determine that the DC/DC converter 20-4 is not connected to the solar cell based on the input voltage, input current, or output currents I1~I4 of the DC/DC converters 20-1~20-4.

The controller 40 resets the phases in accordance with the number (n−k) derived from subtracting the number (k) of the DC/DC converter 20-4 for which the output current I4 is abnormal from the total number (n) of the DC/DC converters 20-1~20-4. Further, the controller 40 controls the DC/DC converters 20-1~20-3 other than the DC/DC converter 20-4 for which the output current I4 is abnormal to perform the switching operation in the reset phases and controls the DC/DC converter 20-4 for which the output current I4 is abnormal not to perform the switching operation. The controller 40 resets the phases of the drive signals S1~S3 so that the phase difference is 360°/(n−k). Since n=4 and k=1 here, the phase difference as reset is 360°/3=120°. Therefore, as shown in FIG. 4, the phases of the drive signals S1~S3 are reset to 0°, 120°, and 240°, respectively. The DC/DC converters 20-1~20-3 perform the switching operation in the phases 0°, 120°, and 240°, respectively. This spreads the output currents I1~I3 evenly over time and ensures that the output current Io is smoothed more properly.

EXAMPLE 2

Case Where a DC/DC Converter is in Trouble

The controller 40 resets the phases, excluding the DC/DC converter in trouble, i.e., the DC/DC converter for which the output current is abnormal. The method of resetting the phases is the same as that of [Example 1]. The controller 40 can identify the DC/DC converter in trouble based on the output currents I1~I4 of the DC/DC converters 20-1~20-4.

EXAMPLE 3

Case Where a Solar Cell Stops Generating Power

In the case the solar cells 10-1~10-4 are installed at mutually distant places, one of the solar cells may stop generating power at sunset or due to variation in the amount of solar radiation. To address this, the controller 40 resets the phases, excluding the DC/DC converter connected to the solar cell that has stopped generating power, i.e., the DC/DC converter for which the output current is abnormal. The method of resetting the phases is the same as that of [Example 1]. The controller 40 can identify the solar cell that has stopped generating power based on the input voltage, input current, or output currents I1~I4 of the DC/DC converters 20-1~20-4.

EXAMPLE 4

Case Where the Output Voltage of a Solar Cell is Equal to or Greater Than the Bus Voltage Vbus The DC/DC converter connected to a solar cell whose output voltage is equal to or greater than the bus voltage Vbus does not perform a switching operation and outputs the input voltage and the input current directly. The output current of the DC/DC converter does not have a ripple and is substantially constant. Therefore, as in the case of [Example 1], the ripple in the output current Io will be uneven over time if the initially set phases are maintained. The output current Io will be insufficiently smoothed absent any measures.

To address this, the controller 40 resets the phases, excluding the DC/DC converter connected to the solar cell whose output voltage is equal to greater than the bus voltage Vbus, i.e., the DC/DC converter for which the output current is substantially constant. The method of resetting the phases is the same as that of [Example 1]. In the cases of [Example 2]~[Example 4], the same advantage as obtained in the case of [Example 1] is obtained.

Thus, according to this embodiment, the phases are reset in accordance with the operating state of the solar cells 10-1~10-4 and the DC/DC converters 20-1~20-4. Therefore, even when the operating state of the solar cells 10-1~10-4 and the DC/DC converters 20-1~20-4 changes and the ripple in the output current Io becomes uneven over time, the ripple in the output current Io can be spread over time again. Accordingly, the output current Io can be smoothed more properly to adapt to various operating states.

Second Embodiment

The second embodiment differs from the first embodiment in that the phases are reset when the number of solar cell panels in the solar cell is increased. The following description highlights the difference from the first embodiment.

Figure 5:
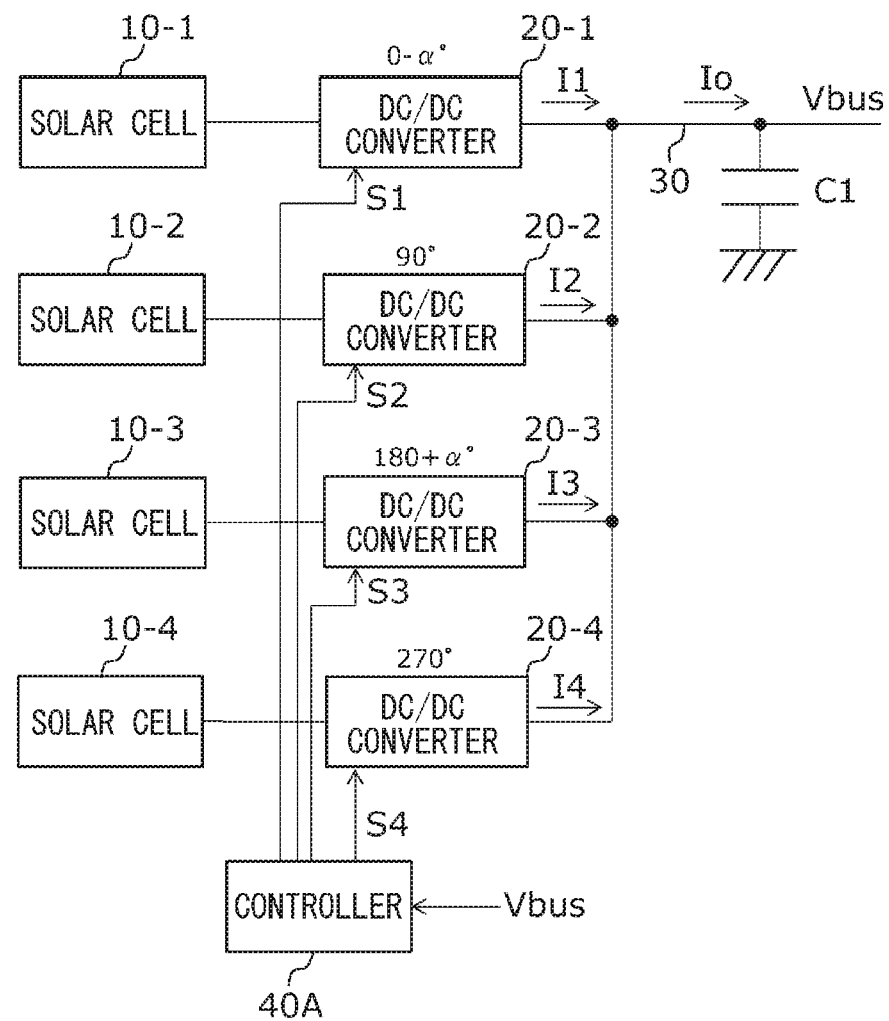
FIG. 5 shows a configuration of a power converter according to a second embodiment.

FIG. 5 shows a configuration of a power converter 1A according to a second embodiment. Referring to FIG. 5, the number of solar cell panels connected in series in, for example, the solar cell 10-2 is increased as compared to that of FIG. 1. As compared with the other solar cells 10-1, 10-3, and 10-4, the number of solar cell panels in the solar cell 10-2 is larger so that the output voltage of the solar cell 10-2 is higher, given the same amount of solar radiation. For this reason, the input current and output current I2 of the DC/DC converter 20-2 are larger than the input current and the output currents I1, I3, I4 of the DC/DC converters 20-1, 20-3, and 20-4.

A controller 40A can identify the solar cell 10-2 in which the number of solar cell panels is increased based on the input voltage, input current, or output currents I1~I4 of the DC/DC converters 20-1~20-4. Alternatively, the solar cell 10-2 in which the number of solar cell panels is increased may be set in the controller 40A by a worker when, for example, the solar cell is exchanged.

Thus, the controller 40A according to this embodiment also resets the phases in accordance with the operating state of the solar cells 10-1~10-4 and the DC/DC converters 20-1~20-4. The controller 40A resets the phases so that the phase difference, between the switching operation of the DC/DC converter that receives an input current larger than a predefined reference value from the corresponding solar cell and the switching operation of the DC/DC converter controlled to perform the switching operation at a point of time adjacent in time to the switching operation of the DC/DC converter receiving the larger input current, is larger than an initial value. The reference value can be set as appropriate through experiments, etc.

Figure 6A:
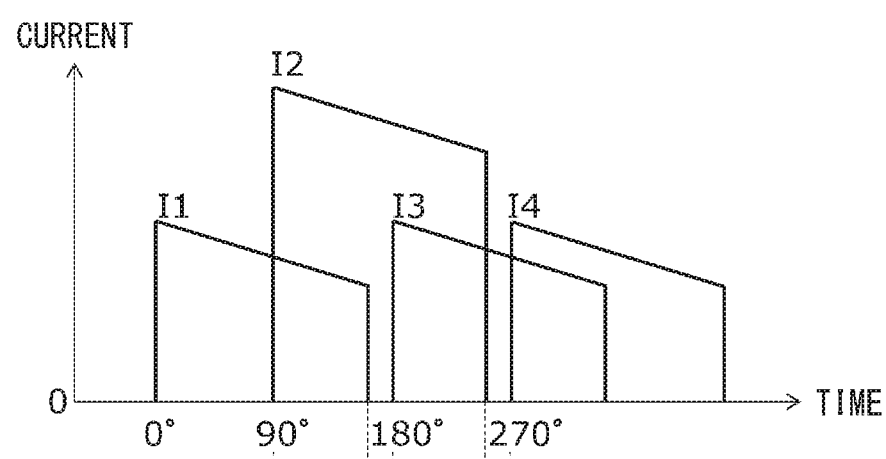
FIG. 6A is a waveform chart showing the output currents occurring before the phases are reset in the power converter of FIG. 5.
Figure 6B:
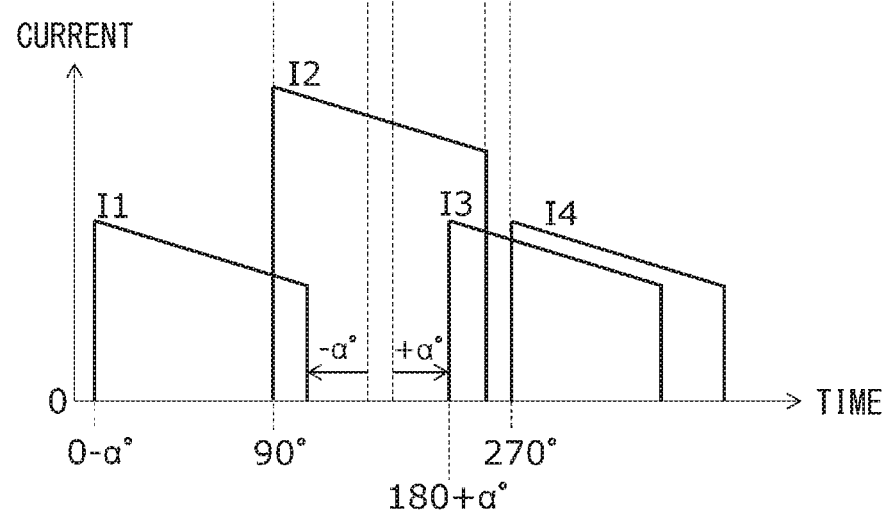
FIG. 6B is a waveform chart showing the output currents occurring after the phases are reset in the power converter of FIG. 5.

FIG. 6A is a waveform chart showing the output currents I1~I4 occurring before the phases are reset in the power converter 1A of FIG. 5, and FIG. 6B is a waveform chart showing the output currents I1~I4 occurring after the phases are reset in the power converter 1A of FIG. 5. As shown in FIG. 6A, the output current I2 is larger than the other output currents I1, I3, and I4, but the phases of the output currents I1~I4 are set evenly before the phases are reset.

In the examples of FIGS. 6A and 6B, the input current of the DC/DC converter 20-2 is larger than the reference value. The point of time when the DC/DC converter 20-1 performs the switching operation and the point of time when the DC/DC converter 20-3 performs the switching operation are adjacent in time to the point of time when the DC/DC converter 20-2 performs the switching operation.

The controller 40A configures the phase of the switching operation of the DC/DC converter 20-1 immediately preceding the switching operation of the DC/DC converter 20-2 receiving the input current larger than the reference value to be smaller than the initial value of 0° and resets the phase to be (0-α)°. Further, the controller 40A configures the phase of the switching operation of the DC/DC converter 20-3 immediately following the switching operation of the DC/DC converter 20-2 receiving the input current larger than the reference value to be larger than the initial value of 180° and resets the phase to be (180+α)°. α may be a fixed value or changed in accordance with a difference in the output currents I1~I4. The optimum value of α can be determined as appropriate through experiments, etc.

Therefore, the phase difference, between the switching operation of the DC/DC converter 20-2 and the switching operation of the DC/DC converters 20-1, 20-3 controlled to perform the switching operation at the points of time adjacent in time to the switching operation of the DC/DC converter 20-2, is reset to be (90+α)°, which is larger than the initial value of 90°.

Therefore, as shown in FIG. 6B, the time period, in which the time period during which the output current I2 flows and the time period during which the output current I1 flows overlap, is shorter than in the case of FIG. 6A after the phases are reset. The time period, in which the time period during which the output current I2 flows and the time period during which the output current I3 flows overlap, is also shorter than in the case of FIG. 6A. In the overlapping periods, the output current Io reaches maximum, but, as compared to the case of FIG. 6A, the overlapping time periods are made shorter as a result of resetting the phases. Therefore, the time period during which the output current Io reaches maximum is made shorter. Accordingly, the output current Io is smoothed more properly by resetting the phases.

The controller 40A may reset only the phase difference between the switching operation of the DC/DC converter 20-2 and the switching operation of the DC/DC converter 20-1 immediately preceding the switching operation of the DC/DC converter 20-2 to be (90+α)°. Alternatively, the controller 40A may reset only the phase difference between the switching operation of the DC/DC converter 20-2 and the switching operation of the DC/DC converter 20-3 immediately following the switching operation of the DC/DC converter 20-2 to be (90+α)°. In these cases, the control can be simplified but the advantage of being able to smooth the output current Io more properly is reduced.

Thus, according to this embodiment, the phases are reset in accordance with the operating state of the solar cells 10-1~10-4 and the DC/DC converters 20-1~20-4. Therefore, even when the number of solar cell panels in the solar cell 10-2 is increased so that the output current I2 of the DC/DC converter 20-2 is increased and the ripple in the output current Io is increased, the output current Io can be smoothed more properly.

The second embodiment may be combined with the first embodiment. This enables addressing a larger number of changes in the operating state.

Third Embodiment

The third embodiment differs from the first embodiment in that the switching period is shortened in addition to resetting the phases when, for example, a solar cell is not connected. The following description highlights the difference from the first embodiment.

The power converter 1 according to the third embodiment is identical to the power converter of the first embodiment except for the function of the controller 40. Therefore, the illustration of the power converter 1 is omitted. The controller 40 resets the phases and also shortens the switching period of the DC/DC converters controlled to performs the switching operation, in accordance with the number (n–k) derived from subtracting the number (k) of the DC/DC converters for which the output current is abnormal and/or the output current is constant from the total number (n) of the DC/DC converters 20-1~20-4. More specifically, the controller 40 resets the phases as in the first embodiment and also changes the switching period by multiplying it (n–k)/n times. In the case n=4 and k=1, for example, the switching period is multiplied by 3/4. The controller 40 controls the DC/DC converters other than the DC/DC converters for which the output current is abnormal and/or the output current is constant to perform the switching operation in the reset phases and at the changed switching period.

Figure 7A:
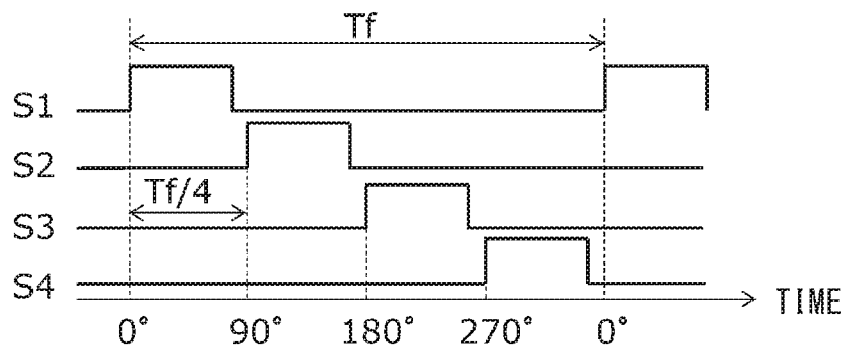
FIG. 7A is a waveform chart showing the drive signals supplied when the output currents of the power converter according to the third embodiment are normal.
Figure 7B:
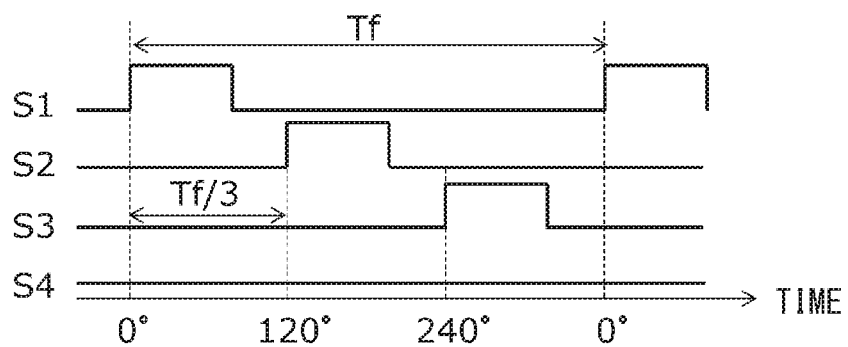
FIG. 7B is a waveform chart showing the drive signals supplied when the output current of the power converter of FIG. 1 is abnormal.
Figure 7C:
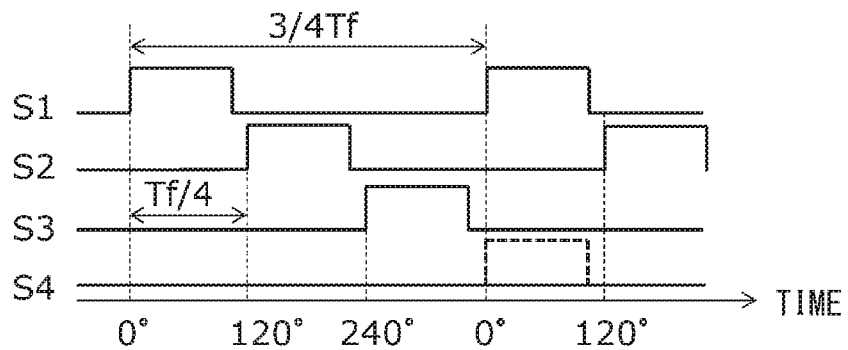
FIG. 7C is a waveform chart showing the drive signals supplied when the output current of the power converter according to the third embodiment is abnormal.

FIG. 7A is a waveform chart showing the drive signals S1~S4 supplied when the output currents I1~I4 of the power converter 1 according to the third embodiment are normal. FIG. 7B is a waveform chart showing the drive signals S1~S4 supplied when the output current I4 of the power converter 1 of FIG. 1 is abnormal. FIG. 7C is a waveform chart showing the drive signals S1~S4 supplied when the output current I4 of the power converter 1 according to the third embodiment is abnormal.

Referring to FIG. 7A, given the switching period of the DC/DC converters 20-1~20-4 is Tf, the control period that elapses since a given DC/DC converter performs the switching operation until another DC/DC converter performs the switching operation is Tf/4. In other words, the DC/DC converters 20-1~20-4 perform the switching operation one by one and sequentially at the intervals of Tf/4.

As shown in FIG. 7B, according to the first embodiment, the switching period Tf is unchanged and the phase difference is reset to be 120° when the output current I4 is abnormal. Therefore, the control period that elapses since a given DC/DC converter performs the switching operation until the next DC/DC converter performs the switching operation is extended from Tf/4 to Tf/3.

By way of contrast, FIG. 7C shows that the switching period is changed to 3/4Tf and the phase difference is reset to be 120° according to this embodiment. Therefore, the control period that elapses since a given DC/DC converter performs the switching operation until the next DC/DC converter performs the switching operation is Tf/4, which remains unchanged before and after an abnormality occurs in the output current I4. In other words, at the point of time when the DC/DC converter 20-4 performs the switching operation by the drive signal S4 before the abnormality in the output current I4 occurs, another DC/DC converter 20-1 performs the switching operation by the drive signal S1. In this case, the control period is shorter than in the first embodiment so that the frequency of the ripple in the output current Io is higher. Accordingly, the ripple in the output current Io can be smoothed by the capacitor C1 more easily as compared with the first embodiment so that the amount of variation in the output current Io, i.e., the magnitude of the ripple in the output current Io is reduced.

Thus, according to this embodiment, the phases are reset and also the switching period is shortened in accordance with the number derived from subtracting the number of the DC/DC converters for which the output current is abnormal and/or the output current is constant from the total number of the DC/DC converters 20-1~20-4. Therefore, even when the operating state of the solar cells 10-1~10-4 and the DC/DC converters 20-1~20-4 changes and the ripple in the output current Io becomes uneven over time, the ripple in the output current Io can be spread over time again and the magnitude of the ripple is ensured to be smaller than that of the first embodiment.

The third embodiment may be combined with the second embodiment. This enables addressing a larger number of changes in the operating state.

Described above is an explanation based on an exemplary embodiment. The embodiment is intended to be illustrative only and it will be understood by those skilled in the art that various modifications to constituting elements and processes could be developed and that such modifications are also within the scope of the present invention.

For example, as DC power sources, electric storage devices or the like may be in place of the solar cells 10-1~10-4.

The embodiments may be defined by the following items.

[Item 1]

A power converter (1, 1A) comprising:

a plurality of DC/DC converters (20-1~20-4) that each converts an output voltage of a corresponding one of DC power sources (10-1~10-4) into a voltage of a different value according to a switching operation and outputs the voltage as converted to a common DC bus (30); and a controller (40, 40A) that controls the plurality of DC/DC converters (20-1~20-4) to perform the switching operation in different phases, wherein the controller (40, 40A) resets the phases in accordance with an operating state of the plurality of DC power sources (10-1~10-4) and the plurality of DC/DC converters (20-1~20-4).

[Item 2] The power converter (1, 1A) according to Item 1, wherein the controller (40, 40A) sets initial values of the phases in accordance with the total number of the plurality of DC/DC converters (20-1~20-4).

[Item 3] The power converter (1, 1A) according to Item 1 or 2, wherein the controller (40, 40A) resets the phases in accordance with the number derived from subtracting the number of DC/DC converters (20-1~20-4) for which an output current is abnormal and/or the output current is constant, from the total number of the plurality of DC/DC converters (20-1~20-4).

[Item 4] The power converter (1, 1A) according to Item 3, wherein the controller (40, 40A) controls the DC/DC converters (20-1~20-4) other than the DC/DC converters (20-1~20-4) for which the output current is abnormal and/or the output current is constant, to perform the switching operation in the reset phases.

[Item 5] The power converter (1, 1A) according to Item 4, wherein the controller (40, 40A) shortens a switching period of the DC/DC converters controlled to perform the switching operation, in accordance with the number derived from subtracting the number of DC/DC converters (20-1~20-4) for which the output current is abnormal and/or the output current is constant, from the total number of the plurality of DC/DC converters (20-1~20-4).

[Item 6] The power converter (1, 1A) according to any one of Items 1 through 5, wherein the controller (40, 40A) resets the phases so that a phase difference, between the switching operation of the DC/DC converter (20-1~20-4) that receives an input current larger than a predefined reference value from a corresponding DC power source (10-1~10-4) and the switching operation of the DC/DC converter (20-1~20-4) controlled to perform the switching operation at a point of time adjacent in time to the switching operation of the DC/DC converter receiving the larger input current, is larger than an initial value.

What is claimed is:

1. A power converter comprising:
   a plurality of DC/DC converters that each converts an output voltage of a corresponding one of DC power sources into a voltage of a different value according to a switching operation and outputs the voltage as converted to a common DC bus; and
   a controller that controls the plurality of DC/DC converters to perform the switching operation in different phases, wherein
   the controller resets the phases in accordance with an operating state of the plurality of DC power sources and the plurality of DC/DC converters.

2. The power converter according to claim 1, wherein the controller sets initial values of the phases in accordance with the total number of the plurality of DC/DC converters.

3. The power converter according to claim 1, wherein the controller resets the phases in accordance with the number derived from subtracting the number of DC/DC converters for which an output current is abnormal and/or the output current is constant, from the total number of the plurality of DC/DC converters.

4. The power converter according to claim 3, wherein the controller controls the DC/DC converters other than the DC/DC converters for which the output current is abnormal and/or the output current is constant, to perform the switching operation in the reset phases.

5. The power converter according to claim 4, wherein the controller shortens a switching period of the DC/DC converters controlled to perform the switching operation, in accordance with the number derived from subtracting the number of DC/DC converters for which the output current is abnormal and/or the output current is constant, from the total number of the plurality of DC/DC converters.

6. The power converter according to claim 1, wherein the controller resets the phases so that a phase difference, between the switching operation of the DC/DC converter that receives an input current larger than a predefined reference value from a corresponding DC power source and the switching operation of the DC/DC converter controlled to perform the switching operation at a point of time adjacent in time to the switching operation of the DC/DC converter receiving the larger input current, is larger than an initial value.

* * * * *